United States Patent [19]

Snellling

[11] 4,355,882
[45] Oct. 26, 1982

[54] MULTIPLE FUNCTION REPRODUCTION APPARATUS

[75] Inventor: Christopher Snellling, Penfield, N.Y.

[73] Assignee: Xerox Corporation, Stamford, Conn.

[21] Appl. No.: 238,509

[22] Filed: Feb. 26, 1981

[51] Int. Cl.$^3$ ............................................. G03G 15/00
[52] U.S. Cl. ............................... 355/3 BE; 355/14 R;
474/87; 474/101; 474/144; 430/54; 226/118
[58] Field of Search ................. 355/3 R, 3 BE, 14 R;
74/840, 37; 474/23, 38, 101, 69, 75, 273, 87,
109, 144; 430/54; 226/113, 118

[56] References Cited

U.S. PATENT DOCUMENTS

| | | | |
|---|---|---|---|
| 3,807,854 | 4/1974 | Tanaka et al. | 355/16 |
| 3,827,801 | 8/1974 | Tanaka et al. | 355/15 |
| 4,169,672 | 10/1979 | Fergg et al. | 355/3 P |
| 4,170,175 | 10/1979 | Conlon, Jr. | 355/3 BE X |
| 4,181,426 | 1/1980 | Blossey et al. | 355/16 |
| 4,188,110 | 2/1980 | Stange | 355/3 BE |
| 4,285,590 | 8/1981 | Silverberg | 355/3 BE X |

Primary Examiner—A. C. Prescott
Attorney, Agent, or Firm—Frederick E. McMullen

[57] ABSTRACT

A multi-mode copying or reproduction apparatus. The apparatus includes a movable, overlong flexible photoconductive belt having image exposure, developing, transfer and cleaning stations operatively disposed about the belt circumference. A two chamber vacuum tensioner is used to collect the extraneous belt length. A raster scanner capable of both writing and reading images on the belt segment laying between the vacuum chambers is provided, together with an auxiliary belt driver for moving the aforementioned belt segment at a speed compatible with that of the raster scanner. An auxiliary charging device, and operators for disengaging selected xerographic components permit selective processing of images written or read by the raster scanner.

18 Claims, 5 Drawing Figures

MULTIPLE FUNCTION REPRODUCTION APPARATUS

This invention relates to an image processing apparatus and method, and more particularly to a multiple function image processing apparatus and method.

Incorporation of a laser Raster Output Scanner, termed a ROS herein, into a xerographic type copying apparatus to achieve dual function capability, namely, copying and image printing from electronically encoded data, is disclosed by U.S. Pat. No. 4,046,471. Extension of this dual function concept to a triple function device by also electronically reading original documents is also known. A description to a device of this type is found in IBM Technical Disclosure Bulletin, pages 3259–3260 (March 1973) entitled "Triple Function Box". In the device depicted therein, the electronic reading function is performed by a Raster Input Scanner, termed RIS herein, which scans the original document with a scanning laser beam. In the described device, both the ROS and RIS functions alternately share the same laser scanning subassembly on a demand basis.

In multi-mode systems of the type alluded to above, a fundamental operating dichotomy exists between the xerographic processing system and the raster scanner. For, as will be understood by those familiar with the xerographic arts, the xerographic process is essentially a continuous process, that is, on a demand for a copy or copies, the various xerographic processing components such as the photoconductive member, charging station, developing station, transfer station, cleaning station, etc. are actuated and remain actuated until the last copy called for has been processed. During this period, the xerographic processing system is operated continuously, and indeed any interruption or stoppage of a component part of that process is viewed as a malfunction.

On the other hand, raster scanners depend on video image signals to represent the image being written or read. The signal frequency or rate of video image signals however is normally such as to necessitate that the scanner operate at a different processing speed than the aforedescribed xerographic processing system. To accommodate this divergency in speed, extensive and relatively expensive signal buffering has therefore been required between the scanner and the source of the image signals used for writing images, as well as between the scanner and the recipient of image signals produced by the scanner.

In addition, the image signal source or recipient may not be able to provide or receive image signals continuously as for example, where the signal source is time shared. Hence, the raster scanner may be required to stop and start in accommodation thereof. To avoid this, one may use intermediate storage buffering which while effective, greatly adds to the system expense.

The invention relates to a multi-mode reproduction apparatus of the type having xerographic processing means for xerographically processing images and a raster scanning means for selectively writing or reading images and which will accommodate any divergence in speed and/or operating cycle between the aforementioned xerographic processing means and the raster scanning means, comprising, in combination: an overlong photoconductive belt; the xerographic processing means being in operative relation with a first portion of the belt; the scanning means being in operative relation with a second portion of the belt remote from the first portion; first drive means for moving the first belt portion at a preset xerographic processing speed; second drive means for moving the second belt portion at a preset scanning speed; and belt takeup means between the first and second belt portions to accommodate any difference in speed or operating cycle between the xerographic processing means and the scanning means.

The invention also relates to the method of operating a multi-mode reproduction apparatus incorporating a xerographic processing system for processing images on an overlong flexible photoconductive member, and a raster scanner having a high intensity beam for writing and reading images on the photoconductive member, the steps which consist of: moving a first portion of the photoconductive member in synchronism with the xerographic processing system while operating the xerographic system to process images on the photoconductive member first portion; moving a second portion of the photoconductive member in synchronism with the transmission of image signals to or from the scanner to write or read images on the photoconductive member; and using the excess length of the photoconductive member to accommodate any difference in operating rates between the xerographic processing system and the raster scanner.

There is described herein a multi-mode reproduction apparatus operable selectively in a COPY mode to xerographically produce one or more copies of a document original in the manner typical of xerographic copiers or machines, in a WRITE mode to xerographically process images produced by scanning the apparatus photoreceptor with a flying spot type scanner modulated in accordance with video image signals, and in a READ mode to scan and convert images on the photoreceptor to video image signals using the same flying spot scanner.

Figure 1:
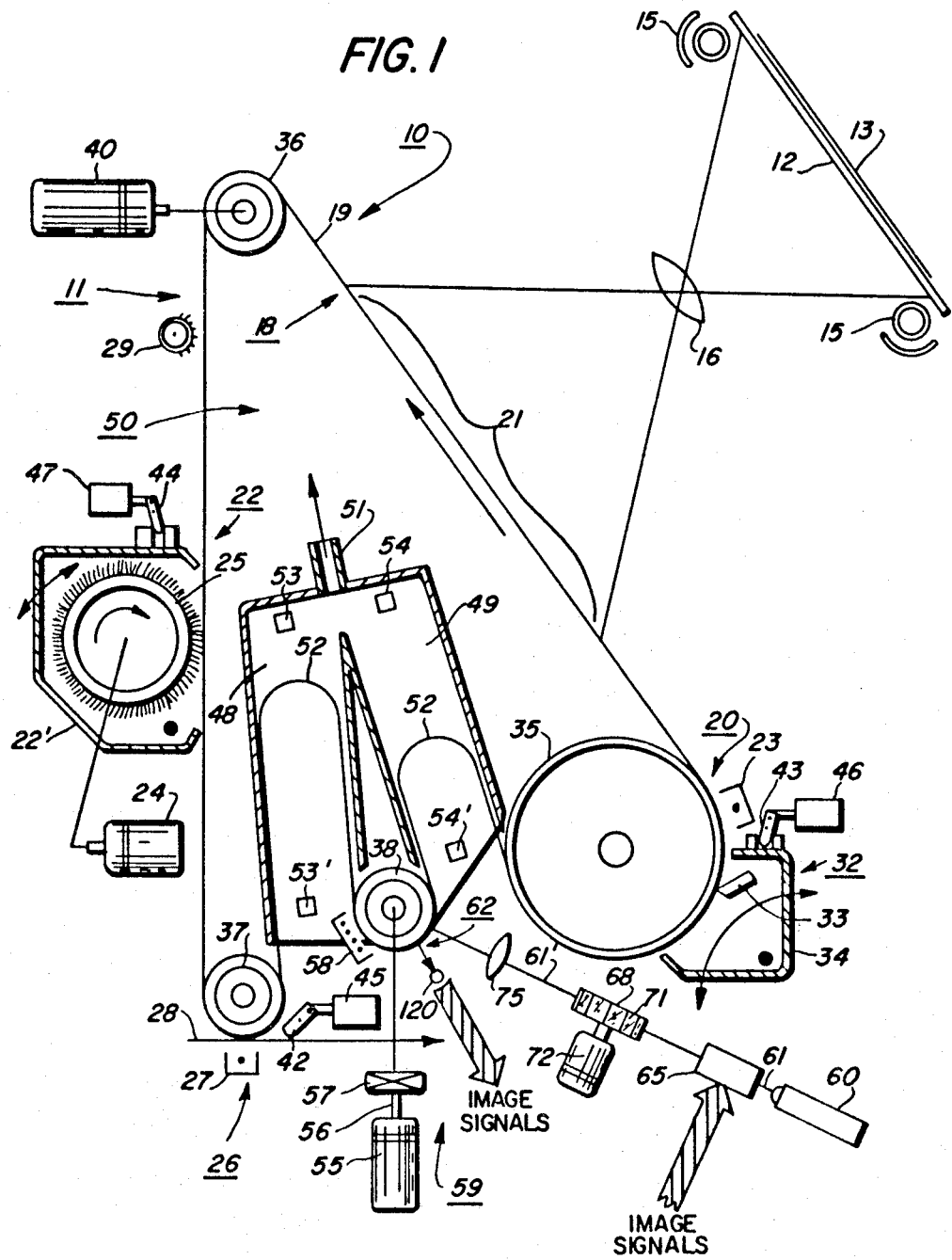
FIG. 1 is a schematic view showing the multi-mode copying or reproduction apparatus of the present invention.

Referring now particularly to FIG. 1 of the drawings, there is shown the multi-mode reproduction apparatus 10 of the present invention. Reproduction apparatus 10 is comprised of a xerographic processing section 11 whereat latent electrostatic images created in either the COPY or WRITE modes are processed xerographically and a scanning section 59 where images are written or read by a flying spot scanner. Xerographic processing section 11 includes a viewing station or platen 12 where document originals 13 to be reproduced or copied are placed. For operation in the COPY mode as will appear more fully herein, a light/lens imaging system is provided, the light/lens system including a light source 15 for flash illuminating the original 13 at platen 12 and a lens 16 for transmitting image rays reflected from the original 13 to the photoconductive surface 19 of a flexible member, shown herein in the form of an endless belt 18, at exposure station 21.

Charging, developing, transfer, and cleaning stations 20, 22, 26, 32 respectively are disposed about belt 18 in operative relation thereto. Charging station 20 includes a corona charging device 23 for depositing a uniform electrostatic charge on the photoconductive surface 19 of belt 18 in preparation for imaging. A suitable developing mechanism, which may, for example, comprise a magnetic brush 25, is provided at developing station 22 for developing the latent electrostatic images created on drum 18. Brush 25 is suitably driven as by motor 24 in the direction of movement of belt 18.

At transfer station 26, corona transfer device 27 effects transfer of the developed image to a suitable copy substrate material 28. A suitable drum cleaning device such as a cleaning bar 33 is provided at cleaning station 32 for removing leftover developing materials from the surface 19 of belt 18. Bar 33 is disposed in a suitable housing 34 wherein leftover developer materials removed from the drum surface by the cleaning bar are collected. An interdocument erase lamp 29 is disposed in operative relation with belt 18 upstream of developing station 22, lamp 29 serving to erase charge areas before, after, and between the latent electrostatic images on belt 18 in a manner known to those skilled in the art.

In the example shown, photoconductive surface 19 comprises a uniform layer of photoconductive material such as amorphous selenium on the surface 19 of an endless belt 18. Belt 18 is supported for movement by rolls 35, 36, 37, 38. As will appear more fully, the length of belt 18 is greater than the processing path defined by rolls 35, 36, 37, 38, and a tensioning means is provided to take up the excess belt length during operation of the apparatus 10. A suitable drive motor 40 is drivingly coupled to roll 36 to move belt 18 in the direction shown by the solid line arrow when processing copies.

When operating in the COPY mode, the photoconductive surface 19 of belt 20 is charged to a uniform level by charging device 23. Platen 12 (and the original document 13 thereon) is irradiated by light source 15, the light reflected from document original 13 being focused onto the photoconductive surface 19 of belt 18 by lens 16 at exposure station 21. The light reflected from the original 13 selectively discharges the charged photoconductive surface in a pattern corresponding to the image that comprises the document original.

The latent electrostatic image created on the surface 19 of drum 18 is developed by magnetic brush 25 and transferred to copy substrate material 28 through the action of transfer device 27. Following transfer, the photoconductive surface 19 of belt 18 is cleaned by cleaning bar 33 to remove leftover developer material. A suitable fuser or fixing device (not shown) fixes the image transferred to copy substrate material 28 to render the copy permanent. Erase lamp is actuated in timed relationship to erase (i.e. discharge) areas of belt 18 before, after and between images.

Photoconductive materials other than selenium, as for example, organic may also be contemplated. And while a flash type imaging system is illustrated, other types of imaging systems such as scan may be contemplated.

The photoconductor may be opaque, that is impervious to light, or wholly or partially transparent. The exemplary belt 18 typically has an aluminum substrate which renders the belt opaque. However, other substrate materials may be contemplated, which would render belt 18 wholly or partially transparent. One organic photoconductive material consists of an aluminized mylar substrate having a layer of selenium dispersed in poly-N-vinyl carbazole with a transparent polymer overcoating containing a charge transport compound such as pyrene.

Raster scanning section 59 has a suitable flux source of electromagnetic radiation such as laser 60. The high intensity collimated beam 61 of monochromatic radiation generated by laser 60 is passed to a modulator 65, which for operation in the WRITE mode, modifies the beam 61 in conformance with information contained in image signals input thereto, as will appear. Modulator 65 may comprise any suitable modulator, such as acousto-optic or electro-optic type modulators for imparting the informational content of the image signals input thereto to beam 61. In the READ mode, a steady state control signal is input to modulator 65 to cause modulator 65 to pass an uninterrupted or steady state beam which, as will appear, serves to scan the image developed on belt 18. Alternately, an optical bypass path may be created to bypass modulator 65 and thereby provide the aforementioned steady state beam, as will be understood by those skilled in the art.

The beam 61 passes via modulator 65 to a rotating scanning polygon 68 driven by polygon motor 72. The scanning beam 61' reflected from the mirrored surfaces or facets 71 of polygon 68 impinges at a moving spot on the surface 19 of belt 18 at a location opposite belt support roll 38 at scan station 62.

The scanning beam 61' from polygon 68 passes to an imaging lens 75 located in the optical path between polygon 68 and belt 18. Lens 75 is of a diameter suitable to receive and focus the scanning light beam reflected by facets 71 of polygon 68 to a selected spot in the focal plane proximate the surface 19 of belt 18.

In the case where the photoconductive material is opaque, light impinging on the surface 19 of belt 18 is reflected. In the case where the photoconductive material is transparent, the light is transmitted, depending on the degree of transparency of the photoconductive material, through the photoconductive material to the interior. The reflected or transmitted light from the photoconductive surface 19 of belt 18 and the developed image thereon is collected by a suitable light collector 120 adjoining belt 18, where the light is converted to image signals when operating in the READ mode, as will appear.

Figure 2:
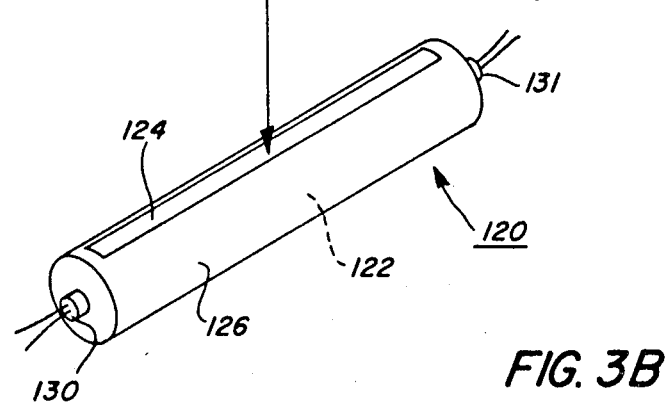
FIG. 2 is an isometric view showing details of the light collector used in the apparatus shown in FIG. 1.

Referring particularly to FIG. 2, the exemplary light collector 120 thereshown comprises an elongated transparent cylindrical rod 122 covered or clad, except for an elongated slit-like aperture 124, with a suitable cladding material 126. Rod 122 is supported so that the aperture 124 is opposite to and facing photoconductive surface 19 of belt 18. As a result, light reflected from the belt surface and the developed image thereon passes through aperture 124 into the interior of rod 122 where the light is trapped and reflected axially along the rod. A pair of photodetectors 130, 131 communicate with the ends of rod 122, photodetectors 130, 131 generating signals in response to the presence or absence of light.

It will be understood that where the photoconductive material is transparent, light collector 120 is suitably supported within the interior of belt 18 to receive light transmitted through the photoconductive material.

Referring to FIGS. 1 and 2, in the COPY mode, latent electrostatic images are formed on the photoconductive surface 19 of belt 18 through exposure of the document original 13 on platen 12 as described heretofore. In the WRITE mode, latent electrostatic images are created on the charged photoconductive surface 19 of belt 18 by means of scanning beam 61'. Modulator 65 modulates the light intensity of scanning beam 61' in accordance with the content of the image signals (IMAGE SIGNALS) input thereto so that scanning beam 61' dissipates the electrostatic charge on the belt surface to create a latent electrostatic image representative of the image signals input thereto. The electrostatic latent image so created is thereafter developed by magnetic brush 25 (cleaning station 32 is disabled, as will appear) and transferred to copy substrate material 28 by corona transfer device 27 at transfer station 26. Following transfer, the surface of belt 18 is cleaned by cleaning bar 33.

In this mode, and in the image READ mode described below, polygon 68 is continually driven at substantially constant velocity by motor 72. In the WRITE mode, the image signal source is controlled so as to be synchronized with rotation of polygon 68. The operating speed of belt 18 determines the spacing of the scan lines and is preferably synchronized to the signal source/recipient 97 (FIG. 3) in order to maintain image linearity.

In the image READ mode, where it is desired to read original 13 and convert the content thereof to image signals, a steady state signal is input to modulator 65 to cause modulator 65 to pass beam 61 therethrough uninterruptedly. As described, polygon 68 scans the now continuous beam 61' across the surface of belt 18 and any image developed thereon.

In this mode, a latent electrostatic image of the original 13 on platen 12 is created on the surface 19 of belt 18 through exposure of the original 13 and subsequent development by magnetic brush 25 in the manner described heretofore. The developed image is carried by belt 18 from developing station 22 to scan station 62 (as will appear, transfer station 26 is disabled) where the image is scanned line by line by the scanning beam 61'. Light from beam 61' striking the photoconductive surface of belt 18 is reflected from the belt surface in accordance with the presence or absence of toner on the belt surface, it being understood that where the light beam strikes toner, the light is absorbed, whereas where the light beam strikes uncovered portions of the photoconductive surface 19 of belt 18, the light is reflected by the photoconductive surface and collected by light collector 120. The presence or absence of light is sensed by photosensors 130, 131 to provide an analog image signal representative of the developed image scanned. Image signals output by photodetectors 130, 131 may thereafter be used to produce additional copies of the document original 13, or stored, or transmitted to a distant point, etc.

Following scanning, the developed image on belt 18 may be transferred to substrate material 28 in the manner described heretofore. In this instance, both cleaning and developing stations 32, 22 respectively are disabled to permit the developed image to pass thereby unimpeded. Alternately, transfer may be dispensed with and the belt surface cleaned by cleaning bar 33.

While the aforedescribed apparatus contemplates reading of developed images through the use of scanning beam 61', the undeveloped latent image may instead be read as by suitable charge detecting means such as an electrometer.

To permit the developed image to pass transfer station 26 unimpeded, corona transfer device 27 may be inactivated and suitable means such as camming elements 42 provided to move the copy substrate material 28 out of contact with the belt surface. Similarly, camming elements 43, 44 may be provided to move housing 34 of cleaning station 32 and developer housing 22' away from the surface of belt 18 to permit developed images to pass thereby following reading thereof by scanning beam 61'. The developed image may thereafter be transferred to copy substrate material 28 following which the surface of belt 18 is cleaned by cleaning bar 33 as described heretofore. In this instance, camming elements 43, 44 are returned to the inactive position to bring both the copy substrate material 28 and cleaning bar 33 into operative contact with the belt surface. At the same time, corona transfer device 27 is activated to transfer the developed image to copy substrate material 28. Alternately, transfer of the developed image may be omitted and the developed image cleaned by cleaning bar 33.

Camming elements 42, 43, 44 may be suitably operated as by solenoids 45, 46, 47 respectively.

As will be understood by those skilled in the art, the optimum speed of photoconductive belt 18 in xerographic processing section 11 is normally different than the belt speed required by scanning section 59 when writing or reading images, the latter normally being restricted by the frequency limitations of the image signal source or recipient. In addition, the operating cycle of xerographic processing section 11 is normally continuous whereas the operating cycle of scanning section 59 may be intermittent in response to the demands of the signal source or recipient. The resulting asynchronous relationship between xerographic processing section 11 and scanning section 59 may be accommodated by means of electronic buffers. However, the large amount of buffer capacity and attendant high cost makes the use of buffers for this purpose relatively unattractive.

To permit an asynchronous operating relation between xerographic processing section 11 and scanning section 59, the length of photoconductive belt 18 is made substantially greater than the belt path defined by belt supporting rolls 35, 36, 37, 38. To accommodate the excess portion of belt 18, a vacuum assisted belt tensioning system having tensioning chambers 48, 49 in the frame section 50 supporting rolls 35, 36, 37, 38 is provided. Tensioning chamber 48 is located on the upstream side of belt support roll 38 while chamber 49 is located on the downstream side of roll 49. Conduit 51 communicates tensioning chambers 48, 49 to a suitable low pressure or vacuum source (not shown) sufficient to draw the excess belt lengths into the chambers 48, 49 to thereby tension belt 18 and draw the photoconductive belt tight about the support rolls 35, 36, 37, 38. As illustrated in FIG. 1 of the drawings, the portions of belt 18 drawn into the tensioning chambers 48, 49 each form a loop 52. To control the size of the belt loops 52, each chamber is provided with maximum and minimum belt loop sensors 53, 53'; 54, 54'.

To permit independent operation of the portion of belt 18 in scanning section 59, belt support roll 38 is independently driven by means of servo motor 55. Shaft 56 of motor 55 is coupled to roll 38 through an electromagnetic type clutch 57. As will appear, clutch 57 permits roll 38 to free wheel during operation of xerographic processing section 11.

To offset the effects of intermittent movement of belt 18 on charging of belt 18, a scorotron type charging device 58 is provided opposite support roll 38 for charging belt 18 preparatory to writing of latent images thereon by scanning beam 61'. As will appear, charging device 23 is inactivated when charging device 58 is in use to prevent placing too great a charge on belt 18.

Figure 3B:
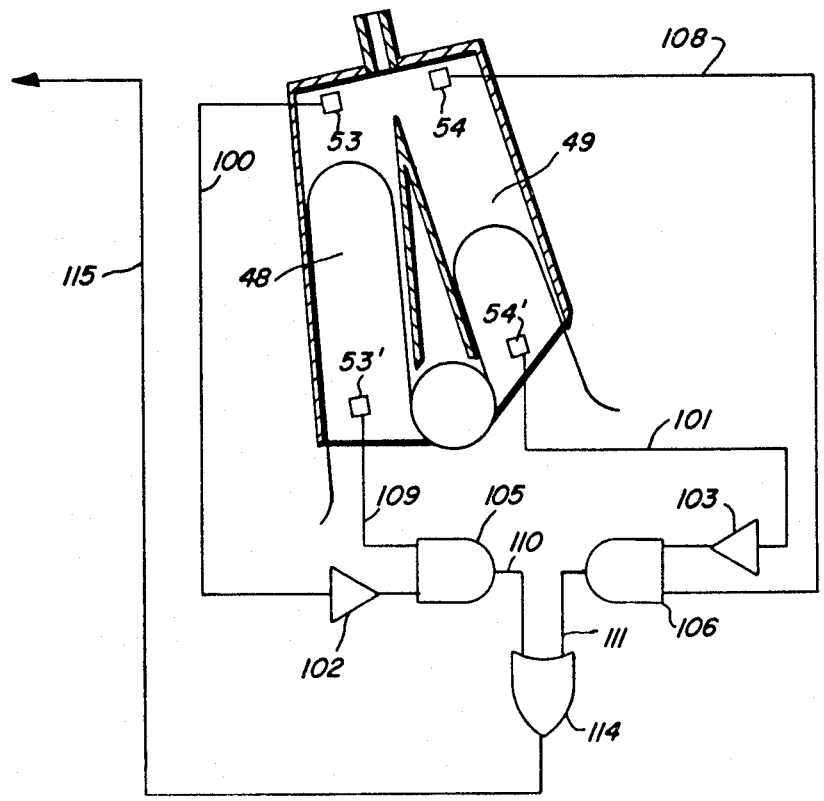
FIGS. 3a and 3b are a control schematic view illustrating details of the control system of the present invention.
Figure 3A:
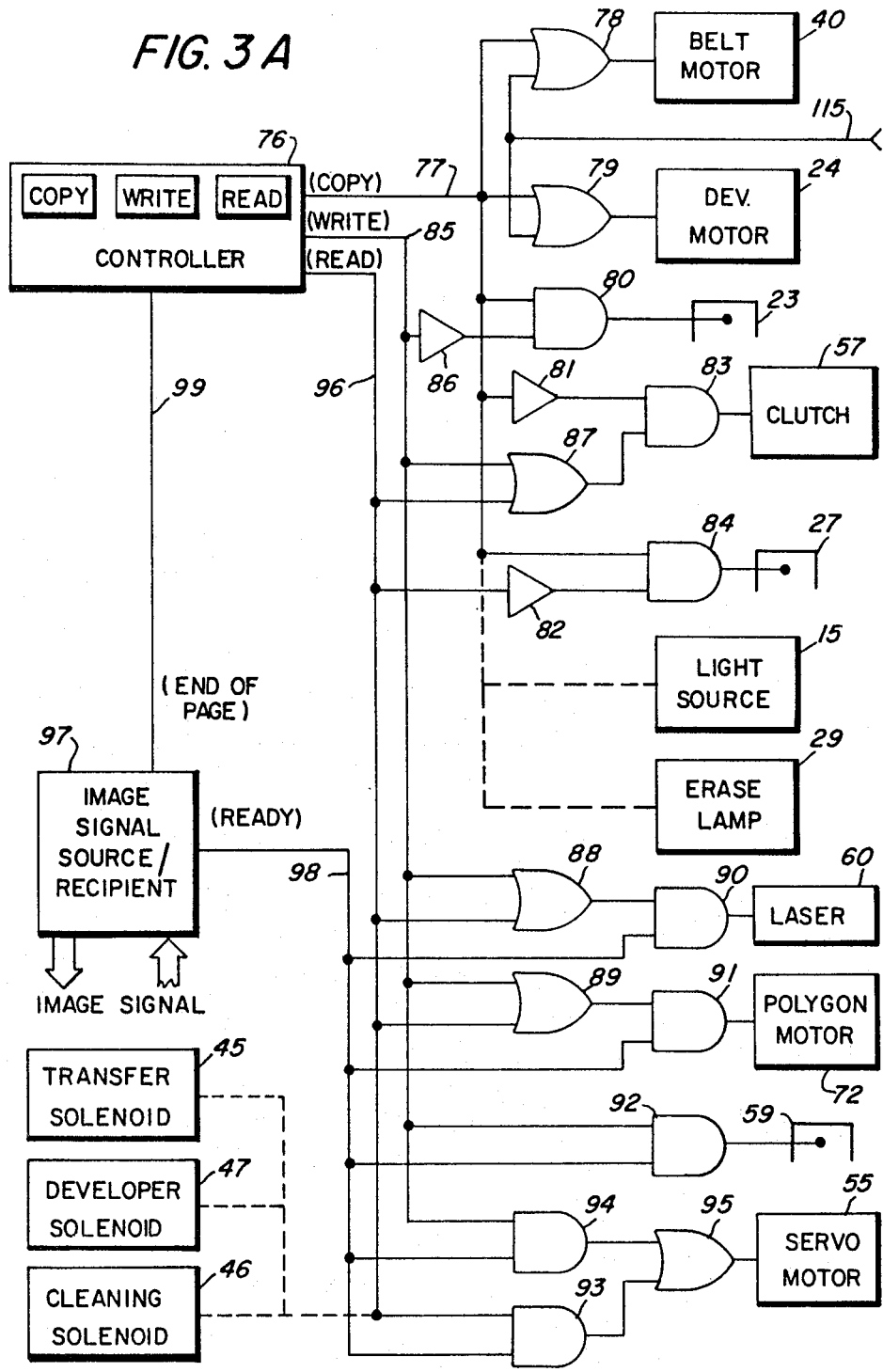
Figure 4:
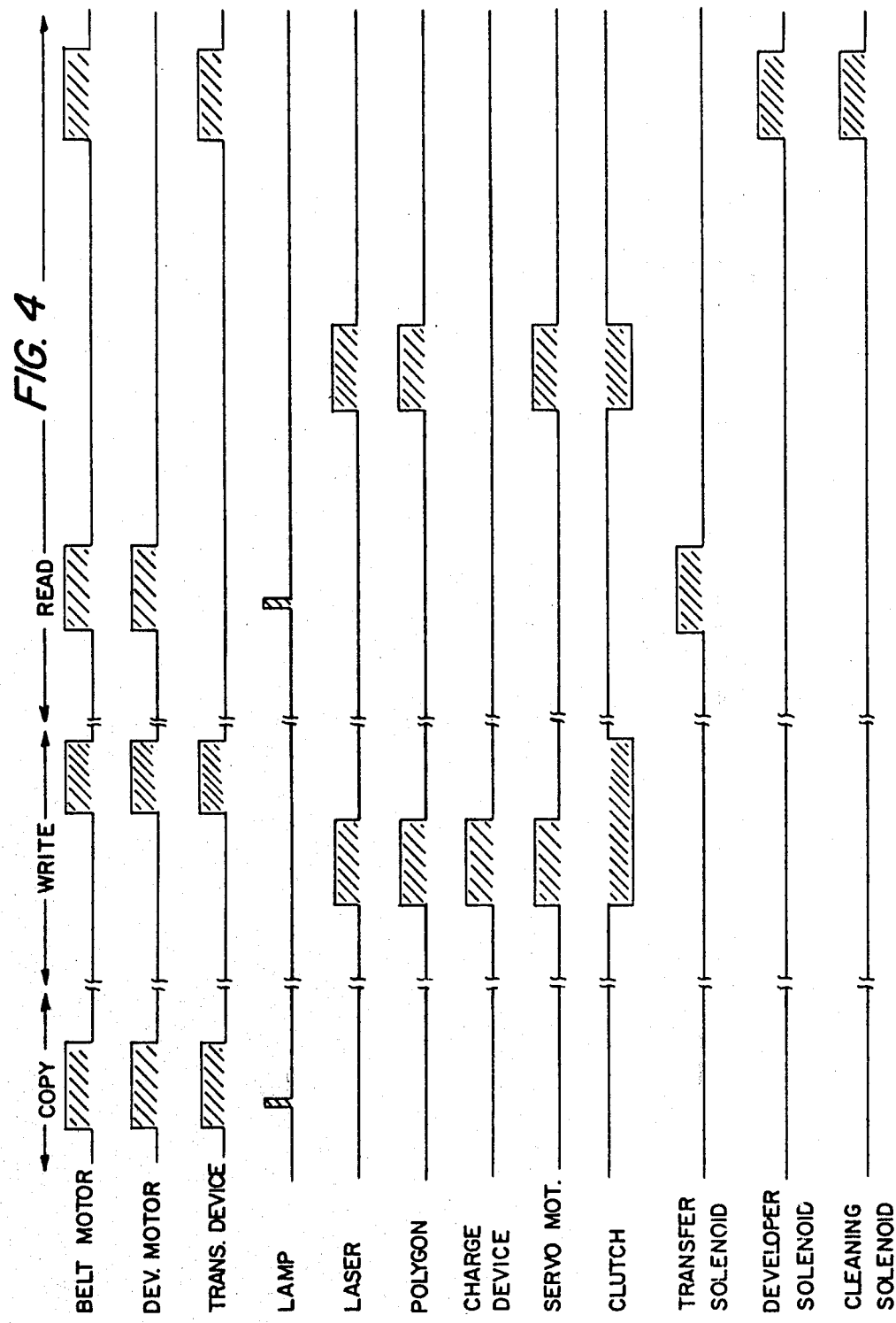
FIG. 4 is a graph showing the operating sequences of certain component parts of the apparatus shown in FIG. 1 during different operating modes.

Referring particularly to FIGS. 3a, 3b of the drawings, a suitable controller 76 is provided, enabling the user or operator of the reproduction apparatus 10 to select the operational mode desired. Lead 77 of controller 76 (COPY) is coupled to OR function belt drive motor and magnetic brush drive motor gates 78, 79 respectively. Controller lead 77 is also coupled to AND function control gates 80, 84 for charge device 23 and transfer device 27, and via inverter 81 to the AND function control gate 83 for clutch 57. Controller 76 also serves to control operation of the xerographic processing system 11 in a manner known to those skilled in the art including actuation of flash lamps 15 and erase lamp 29 in timed synchronization with belt 18 as shown in FIG. 4.

A second control lead 85 of controller 76 (WRITE) is coupled through inverters 86, 82 to charge and transfer control gates 80, 84 and through OR function gate 87 to a second input of clutch control gate 83. Lead 85 is also coupled through OR function gates 88, 89 to AND function control gates 90, 91 for laser 60 and polygon drive motor 72. Lead 85 is coupled to the control gate 92 for charge device 59, and through a first AND function control gate 94 to OR function gate 95 for servo motor 55.

A third control lead 96 of controller 76 (READ) is coupled to a second input of OR function gate 87 for clutch control gate 83. Lead 96 is coupled to a second input of OR function gates 88, 89 for laser and polygon motor control gates 90, 91, and to one input of a second motor control gate 93 for servo motor 55. Additionally, timed control signals output by controller 76 are input to copy substrate, cleaning, and developer separation solenoids 45, 46, 47 respectively to control operation of separating cams 42, 43, 44 in timed synchronization with operation of reproduction apparatus 10.

To correlate operation of reproduction apparatus 10 in the WRITE and READ modes with the image signal source or recipient 97, source/recipient 97 is coupled to laser, polygon motor, charging device and servo motor control gates 90, 91, 92, 93, 94 respectively through lead 98. Lead 99 interconnects controller 76 with signal source/recipient 97. As will be understood, signal source/recipient 97 may comprise any suitable source or receiver of image signals such as a data transmission channel, memory, etc.

To control the size of belt loop 52 in tensioning chambers 48, 49 and prevent either excessive or minimal amounts of belt 18 from occurring in chambers 48, 49 during operation of reproduction apparatus 10, maximum and minimum belt loop size sensors 53, 54' are coupled through leads 100, 101 and inverters 102, 103 to loop control gates 105, 106. Maximum and minimum belt loop size sensors 54, 53' are coupled through leads 108, 109 to a second input of gates 105, 106. Leads 110, 111 couple the output of gates 105, 106 to OR function gate 114. The output of gate 114 is coupled by lead 115 to a second input of belt motor and brush drive motor gates 78, 79.

Referring particularly to FIGS. 3a, 3b and 4, in the COPY mode, xerographic processing system 11 is actuated to make one or more copies of the document 13 on platen 12. The signal output (COPY) of controller 76 to lead 77 energizes belt drive motor 40, magnetic brush drive motor 24, corona charging device 23 and transfer device 27. At the same time, the signal (COPY) de-energizes clutch 57 to permit support roll 38 to free wheel.

In this state, document originals 13 deposited on platen 12 are xerographically processed to provide one or more copies thereof on copy substrate material 28 in the manner described heretofore.

In the WRITE mode, both xerographic processing system 11 and scanning section 59 are operative to make copies of images derived from image signals output by image signal source/recipient 97. The signal output (WRITE) of controller 76 to lead 85 enables, through control gates 90, 91, 92, 94 laser 60, polygon motor 72, charging device 59, and servo motor 55 respectively. At the same time, the signal (WRITE) from controller 76 triggers control gate 83 to energize clutch 57 and couple servo motor 55 to support roll 38. The controller signal (WRITE) in lead 96 further disables gate 80 to inhibit operation of charging device 23.

Presuming there to be a supply of belt material in tensioning chambers 48, 49, a ready signal from image signal source/recipient 97 (indicating transmittal of image signals to modulator 65) in lead 98 triggers gates 90, 91, 92, 94 to energize laser 60, polygon motor 72, charging device 59, and servo motor 55. Motor 55 drives support roll 38 through clutch 57 to move the portion of belt 18 opposite thereto in synchronism with the image signal input. With movement of belt 18, the length of belt 18 held under vacuum tension in chamber 48 decreases while the amount of belt in chamber 49 increases, as will be understood.

Charging device 59 charges the belt 18 as the belt is moved forward by roll 38, the charged photoconductive surface 19 of belt 18 being selectively discharged by the scanning beam 61' sweeping thereacross. As is understood, modulator 65 modulates the beam 61 of high intensity light output by laser 60 in accordance with the image signals input to modulator 65 by image signal source/recipient 97.

The aforedescribed procedure continues until the image signal output of signal source/recipient 97 terminates. On resumption of image signals, operation of scanning section 59 is resumed.

On completion of the image, a signal END OF PAGE is output by image signal source/recipient 97 via lead 99 to controller 76 to switch controller 76 from WRITE to COPY mode. The latent electrostatic image produced by scanning section 59 is accordingly processed by image processing system 11 to develop and transfer the latent image to copy substrate material 28 as described above. It will be understood that corona charging device 23 and light source 15 are held inactive during this process. And in order to replenish the supply of belt material in chamber 48 for the next write cycle, clutch 57 may be maintained in temporary engagement to prevent rotation of belt support roll 38 to cause the loop of belt material in chamber 49 to be taken up while increasing the loop of belt material in chamber 48.

If during image writing, the belt loop 52 in tensioning chamber 48 falls too low or the loop 52 in chamber 49 rises too high, minimum or maximum belt loop sensor 53', 54 respectively responds to trigger loop control gate 105 or 106. The signal output of gate 105 or 106 in turn triggers belt motor and developer motor control gates 78, 79 respectively via lead 115 to start belt motor 40 and magnetic brush drive motor 24. As a result, belt 18 is driven at relatively high speed to increase the size of the belt loop 52 in chamber 48 while decreasing the loop size in chamber 49. On the belt loop in chamber 48 reaching a preset maximum height or the loop in chamber 49 reaching a preset minimum low level, sensor 53 or 54' responds to inactivate the loop control gate 105, 106 associated therewith and terminate operation of belt drive motor 40 and magnetic brush drive motor 24.

It is understood that during the aforedescribed adjustment of the belt loops in tensioning chambers 48, 49, support roll 38, which may be either stationary, or moving at the relatively lower belt speed associated with the image signal transmission rate, serves as a brake to limit belt movement and hence permit the size of the belt loops in tensioning chambers 48, 49 to be adjusted.

In the READ mode, both xerographic processing system 11 and scanning section 59 are operative to scan images developed on belt 18. The image signals generated by scanning section 59 are output to image signal source/recipient 97.

In this mode, xerographic processing system 11 is operated in the manner described heretofore in the COPY mode to create and develop an image of the document original 13 on platen 12. Transfer station separation solenoid 45 is actuated to displace cam 42 and separate the copy substrate material 28 from belt 18. Transfer charge device 27 is similarly disabled to permit the developed image to pass transfer station 26 unimpeded and into tensioning chamber 48 where the developed image is held pending reading thereof by scanning section 59.

In the READ mode, the signal output (READ) of controller 76 in lead 96 enables control gates 90, 91, 93 of laser 60, polygon motor 72, and servo motor 55. At the same time, the signal from controller 76 to gate 87 actuates clutch 57 to couple servo motor 55 to belt support roll 38.

On receipt of a signal (READY) from image signal source/recipient 97 in lead 98, control gates 90, 91, 93 are triggered to actuate laser 60, polygon motor 72, and servo motor 55. Energization of servo motor 55 advances the portion of belt 18 adjacent thereto forward to permit the scanning beam 61' to scan the developed image line by line. As beam 61' scans across the developed image, light reflected therefrom is intercepted and collected by light collector 120. As described, light entering aperture 124 of collector 120 is trapped therewithin and traverses lengthwise along the collector rod 122 to the ends thereof where the presence or absence of light is sensed by photodetectors 130, 131. The signal output of detectors 130, 131, representing the image content of the developed image, is output to image signal source/recipient 97.

As described, should the size of the belt loop 52 in chamber 48 fall to a preset minimum or should the belt loop in chamber 49 reach a preset maximum level, belt drive motor 40 and magnetic brush drive motor 24 are energized to replenish/reduce the belt loops in the respective tensioning chambers 48, 49.

On completing scanning of the developed image, image processing section 11 is operated. Where transfer of the developed image to copy substrate material 28 is not desired, the developing material is removed from belt 18 by cleaning bar 33 at cleaning station 32. Where a copy of the developed image is desired, cleaning and developer separation solenoids 46, 47 are actuated to displace cams 43, 44 and move cleaning station housing 34 and developer housing 22' away from the belt surface. This permits the developed image to pass unimpeded to transfer station 26 where the developed image is transferred to copy substrate material 28 in the manner described heretofore.

While a vacuum belt tensioning system has been shown and described herein, other belt tensioning arrangements such as dancer roll type belt tensioners may be contemplated. Further, some or all of belt support rolls 35, 36, 37, 38 may be sprocketed for engagement with holes in belt 18 to assure positive driving engagement between belt 18 and rolls 35, 36, 37, 38 and prevent slip.

While servo motor 55 is illustrated as being coupled to belt support roll 38 through clutch 57, clutch 57 may be dispensed with and motor 55 coupled directly to roll 38. In that event, a suitable control would be provided to synchronize servo motor 55 with belt drive motor 40 during the COPY mode so as to drive roll 38 at the same speed as belt support roll 36.

While the invention has been described with reference to the structure disclosed, it is not confined to the details set forth, but is intended to cover such modifications or changes as may come within the scope of the following claims.

I claim:

1. In a multi-mode reproduction apparatus, the combination of:
   (a) an overlong photoconductive belt;
   (b) xerographic processing means in operative relation with a first portion of said belt;
   (c) scanning means in operative relation with a second portion of said belt;
   (d) first drive means for moving said first belt portion at a preset xerographic processing speed;
   (e) second drive means for moving said second belt portion at a preset scanning speed; and
   (f) belt takeup means between said first and second belt portions to accommodate any difference in speed or operating cycle between said xerographic processing means and said scanning means.

2. The apparatus according to claim 1 in which said xerographic processing means includes a first charging means for charging said first belt portion, and said scanning means includes second charging means for charging said second belt portion.

3. The apparatus according to claim 2 in which said scanning means includes:
   a high intensity beam of electromagnetic radiation;
   means for scanning said beam across said photoconductive belt following charging by said second charging means; and
   means for modulating said beam in accordance with an image signal input whereby to create latent electrostatic images corresponding to said image signal input on said belt for processing by said xerographic processing means.

4. The apparatus according to claim 1 or 2 in which said scanning means includes:
   a high intensity beam of electromagnetic radiation;
   means for scanning said beam across said photoconductive belt and images developed thereon by said xerographic processing means; and
   means for converting radiation reflected from said belt during scanning of developed images to image signals.

5. The apparatus according to claim 1 in which said belt takeup means comprises vacuum tensioning means.

6. The apparatus according to claim 5 including plural support rolls for said belt, at least one of said support rolls being engageable with said second belt portion, said vacuum tensioning means including a first vacuum tensioning chamber upstream of said one support roll and a second vacuum tensioning chamber downstream of said one support roll, said second drive means being drivingly coupled to said one support roll to drive said one belt support roll and said second belt portion at said preset scanning speed, said first and second vacuum tensioning chambers providing belt supply and storage to accommodate movement of said second belt portion by said one support roll.

7. The apparatus according to claim 6 in which said scanning means includes:

a high intensity beam of electromagnetic radiation, and means for scanning said beam across said belt adjacent said one support roll.

8. The apparatus according to claim 1 including:

plural support rolls for said belt;

at least one of said support rolls being engageable with said second belt portion; and means for operating said one support roll at either of said preset xerographic processing speed or said preset scanning speed.

9. A method of operating a multi-mode reproduction apparatus incorporating a xerographic processing system for processing images on an overlong flexible photoconductive member and a raster scanner having a high intensity beam for writing and reading images on said photoconductive member, the steps of:

(a) moving a first portion of said photoconductive member in synchronism with said xerographic processing system while operating said xerographic processing system;

(b) moving a second portion of said photoconductive member in synchronism with the transmission of image signals to or from said raster scanner to write or read images on said member; and (c) using the excess length of said photoconductive member to accommodate any difference in operating rates between said xerographic processing system and said raster scanner.

10. The method according to claim 9 including the step of storing excess lengths of said photoconductive member at the boundaries of said first and second photoconductive member portions with one another.

11. The method according to claim 10 including the step of applying a tensioning force to said photoconductive member at said boundaries to draw excess portions of said photoconductive member into loops and tension said photoconductive member.

12. The method according to claim 9 including the step of moving both said first and second portions of said photoconductive member in synchronism with said xerographic processing system while operating said xerographic processing system.

13. In the method of operating a combined xerographic reproduction apparatus and raster scanner to permit xerographic image processing and raster scanning at different rates and cycles, the steps which consist of:

(a) moving the reproduction apparatus photoconductive belt at a first rate while xerographically processing images on said belt;

(b) moving a segment of said belt at a second rate different than said first rate while scanning images on said belt to produce image signals representative of the images scanned; and (c) accommodating the difference between said first and second rates by temporarily storing unread parts of said images on a takeup portion of said belt upstream of the point where said belt is scanned by said scanner.

14. The method according to claim 13 including the step of holding previously scanned parts of said images on a second takeup portion of said belt downstream of the point where said belt is scanned by said scanner.

15. In the method of operating a combined xerographic reproduction apparatus and raster scanner to permit xerographic image processing and raster scanning at different rates and cycles, the steps which consist of:

(a) moving the reproduction apparatus photoconductive belt at a first rate while xerographically processing images on said belt;

(b) moving a segment of said belt at a second rate different than said first rate while scanning said belt to produce images on said belt;

(c) xerographically processing said images; and (d) accommodating the difference between said first and second rates by temporarily storing said images on a takeup portion of said belt downstream of the point where said belt is scanned by said scanner pending xerographic processing of said images.

16. The method according to claim 15 including the step of providing a supply of said belt for scanning on a second takeup portion of said belt upstream of the point where said belt is scanned by said scanner.

17. The method according to claim 13 or 15 including the step of moving said belt at said first rate to permit xerographic processing of said images to be resumed following image scanning.

18. The method according to claim 14 or 16 including the step of:

moving the remainder of said belt except for said belt segment at said first speed when said first takeup portion reaches a predetermined low or when said second takeup portion reaches a predetermined high.

* * * * *